Jan. 28, 1930.  F. W. GAY  1,744,879
ALTERNATING CURRENT GENERATOR AND CIRCUIT
AND CONTROL OF AUXILIARIES THEREFOR
Filed Dec. 17, 1927   3 Sheets-Sheet 1

INVENTOR.
FRAZER W. GAY
BY
George D. Richards
ATTORNEY

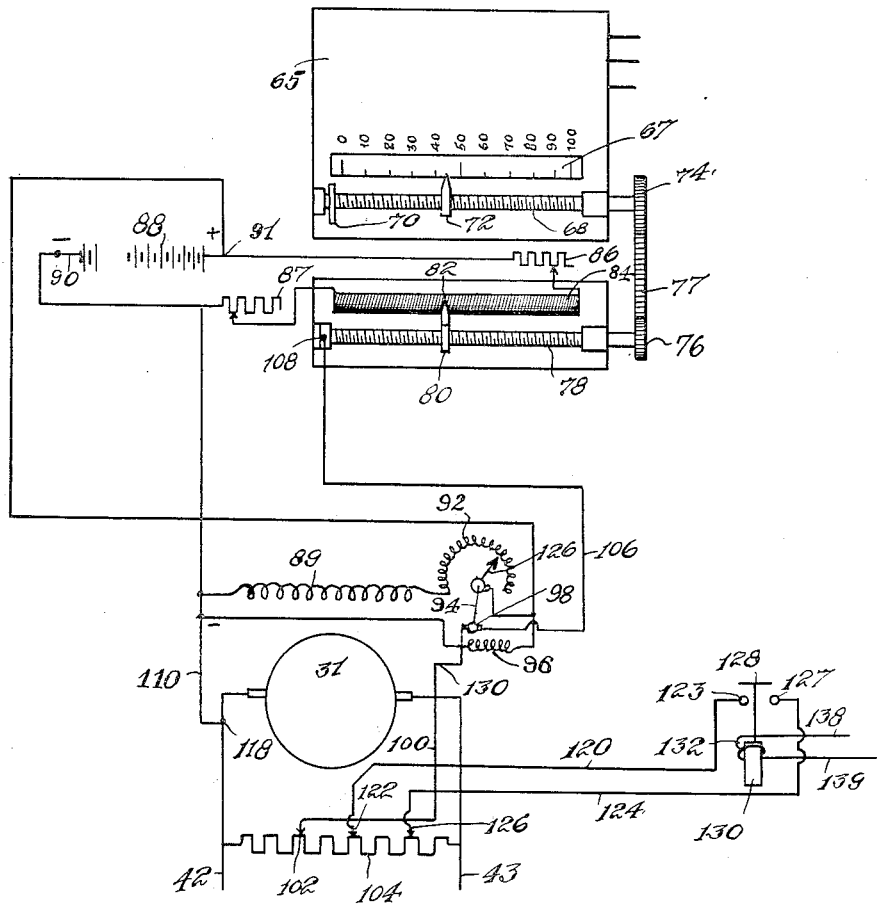

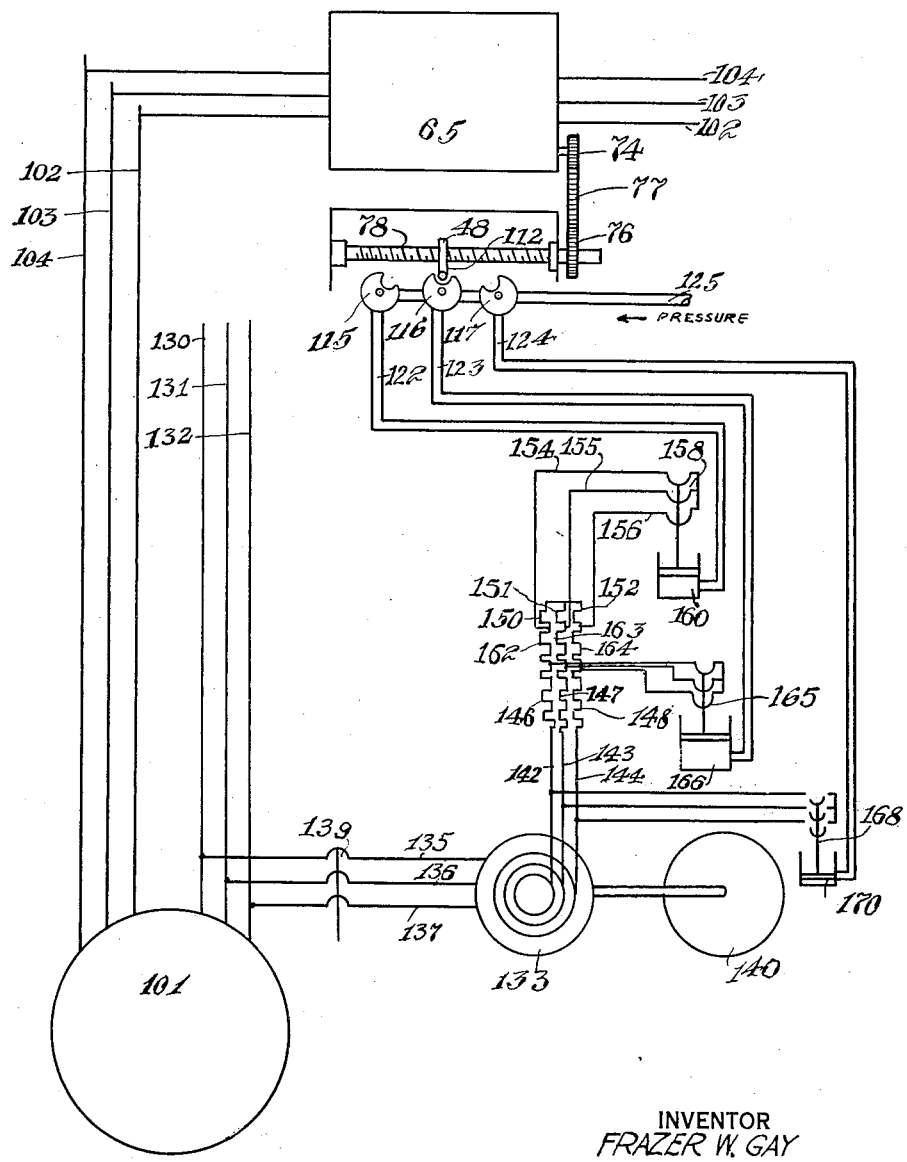

Patented Jan. 28, 1930

1,744,879

UNITED STATES PATENT OFFICE

FRAZER W. GAY, OF NEWARK, NEW JERSEY

ALTERNATING-CURRENT GENERATOR AND CIRCUIT AND CONTROL OF AUXILIARIES THEREFOR

Application filed December 17, 1927. Serial No. 240,714.

This invention relates to a means of furnishing the motors driving the auxiliaries of a turbo generator with power best adapted to drive those auxiliaries under load changes on said turbo generator ranging anywhere from no load to the maximum which it is capable of carrying.

In large modern power stations the size of the individual turbo unit is so great that it is becoming standard practice to consider each unit as, in effect a power plant by itself and under this plan each unit has its own boilers with their auxiliary fuel supply induced and forced draft fans, condenser systems, and so on.

In my patent application Ser. No. 240,713, filed December 17, 1927, I have shown how each turbo unit may be wound to supply its own auxiliary power circuit and in this invention I show novel means for rendering this power most suitable for the best type of motors adapted to drive the turbo auxiliaries.

Now the motors driving the auxiliaries of a turbo generator can be arranged in two groups in which the first group consists of motors which work at a substantially constant speed over all loads on the turbo generator. In this group lie motors which must pump water or air against a constant pressure. The second group of motors are those which have a definite small load requiring a low speed when the generator is running light and whose load and speed must increase greatly with load on the generator.

I propose to use direct current motors for all important drives and to supply duplicate sources of direct current for each of the above mentioned groups, constant potential D. C. for those motors required to run at constant speed, at all loads and potential varying with load for those motors whose speed is required to vary with load. According to the present invention I cause a turbo generator wattmeter to change the D. C. voltage on the last group. This voltage change may be in the order of 60 volts at no load and 360 volts at 125% load on the turbine. It will of course be necessary to make minor adjustments or variations in the speed of individual motors to make their speeds come nearer to the ideal speed than can be done by the variation in voltage. The voltage variation will take care of the major variations. The minor variations will be attained by changing the strength of the fields on the motors.

According to this invention I use, as sources of direct current power, D. C. generators directly connected to synchronous motors where these motors receive their energy from the main generator windings. In this case the synchronous motors are made rather large for the generators and are designed to have a very great pull out torque even on low voltage when desired, a low voltage relay is installed which will cause the D. C. variable voltage to be reduced in case of low voltage on the A. C. end caused by a short circuit on some or all of the generator windings. In general D. C. motors for variable speed duty are so chosen that the major changes in speed with load are cared for by voltage changes and minor speed adjustments required to obtain maximum efficiency are obtained by field variations on individual motors.

An advantage of this invention is very great flexibility of performance and control. Motors requiring very great speed variation with load are generally shunt wound or have a very light series field while motors not requiring so great a speed variation with load are generally compound shunt wound and have a rather heavy series field. Most of the motors that are connected to the variation voltage bus have loads that change greatly with speed.

Now it is a well known fact that maximum efficiency and economy in motor design can only be obtained in a variable speed motor when the motor is operating at full speed with substantially full flux. This is especially so when the load is light at fractional speeds and very heavy at maximum speed.

Various other objects and advantages of the invention will be apparent from the following description of an illustrative example of an embodiment of the invention, and from the accompanying drawings, and also from the statements of the invention set forth in the appended claims. And the invention also consists in the new and useful combinations and arrangements of the apparatus and circuits, all as described and shown herein set forth in the appended claims.

The invention is illustrated in the accompanying drawings, in which:

Figure 2 is a diagram of a circuit including a wattmeter connected for controlling apparatus connected therewith; and Figure 3 is a diagram of a power station circuit showing an alternate arrangement of auxiliary apparatus, controlled through a wattmeter connected to the main bus line or alternating current source.

In the above described views of the drawings, like reference characters refer to the corresponding parts throughout.

Figure 1:
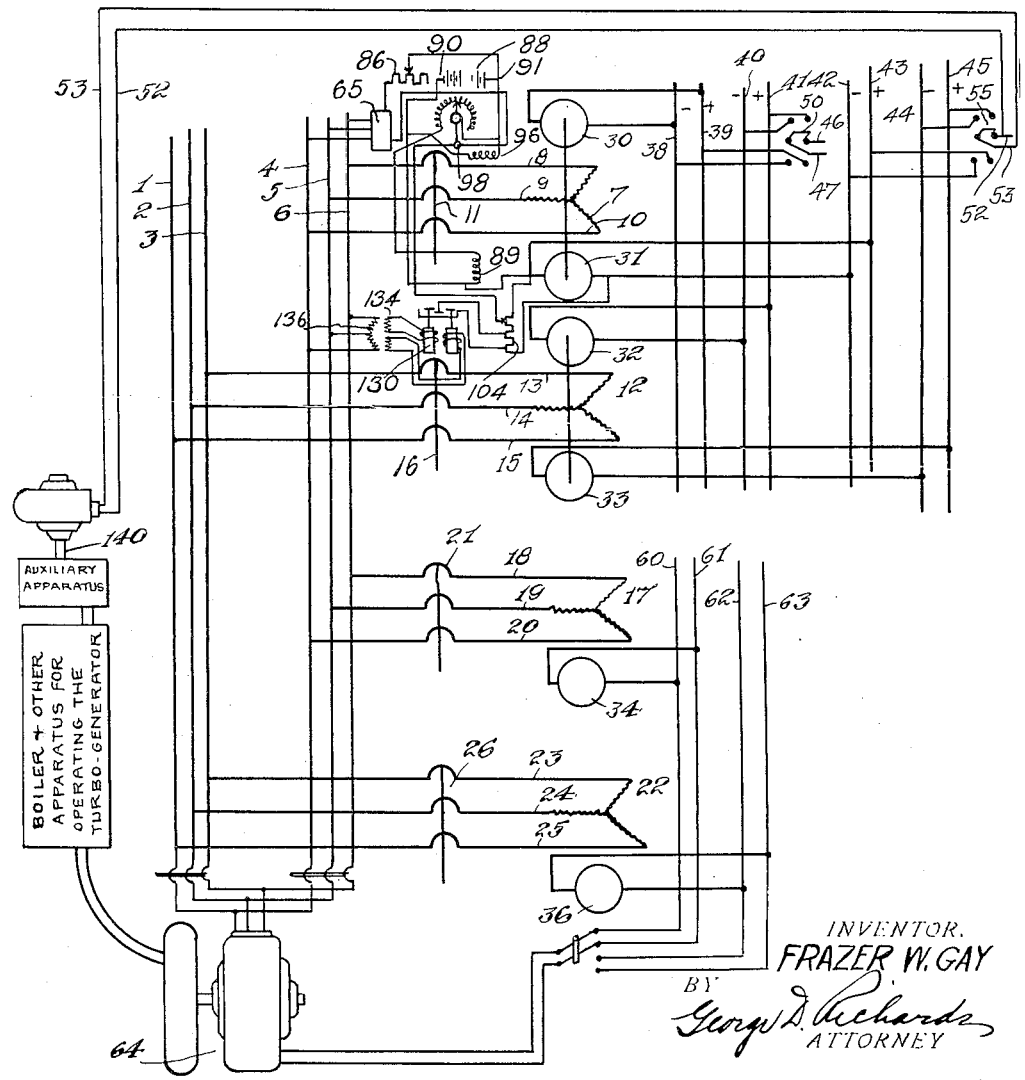
Figure 1 is a diagram of a circuit which includes the apparatus of the invention.

Referring now to Fig. 1 of the drawings, the two three phase power busses lines 1, 2, 3, and 4, 5, 6 have connected to them the synchronous motor 7 through leads 8, 9, 10 and circuit make and break device 11; synchronous motor 12 through leads 13, 14, 15 through make and break device 16; synchronous motor 17 through leads 18, 19, 20 and make and break device 21; and synchronous motor 22 through leads 23, 24, 25 and make and break device 26 as shown. Each synchronous motor is directly connected to D. C. generators as motor 7 to generators 30 and 31; motor 12 to generators 32 and 33; motor 17 to generator 34 and motor 22 to generator 36 D. C. generators 30 and 32 are connected to constant voltage busses 38 and 39, and 40, 41 respectively, and D. C. generators 31 and 33 are connected to variable voltage busses 42, 43 and 44, 45, respectively. Constant voltage motor circuits as 46, 47 for instance, may be connected to either constant voltage bus lines 38, 39 or 40, 41 by double pole switching device 50 as shown. Variable speed variable voltage auxiliary motor circuits as 52, 53 for instance are shown connected to variable voltage busses 42, 43 and 44, 45 by double pole switching device 55 as shown. Generators 34 and 36 are main and auxiliary exciters connected to exciter busses 60, 61 and 62, 63 as shown. These exciters perform their function of exciting the turbo generator 64 in the usual manner, well known.

In Fig. 2 I have shown a means of causing the voltage of said generators 31 (or 33) to vary in accordance with the load on said turbo generator 64. I have shown the equipment associated with said generator 31 and its said connected busses 42 and 43. A wattmeter 65 indicates on scale 67 the load on said turbo generator 64 with which said generator 31 is associated in auxiliary capacity. Said wattmeter 65 is of common form in which a threaded shaft 68 is turned through pulley 70. This threaded shaft drives pointer 72 which is shown indicating the load on the turbo generator 64 in per cent of maximum load as shown. I have shown attached to the end of the shaft 68 a sprocket wheel 74 driving a similar sprocket wheel 76 by chain 77. Said sprocket wheel 76 drives the threaded shaft 78 which causes the nut 80, mounted thereon, to occupy a position always directly under indicator 72.

The above described wattemeter and its attachment or equivalent can be secured in the open market.

A contactor 82 carried by said nut 80 rides in circuit making relation with a tubular wound rheostat 84 which is in series with variable resistance 86 and 87 and constant potential source 88, by the terminals 90 and 91 thereof. It will be apparent that the percentage of said rheostat 84 cut into series between said resistance 87 and contactor 82 will be the same as the percentage load on said turbo generator 64, as indicated on said wattmeter 67 which reads from zero to 100. The field 89 of said generator 31 is connected across the said terminals 90 and 91 of said constant potential source 88 and in series with a motor driven rheostat 92. A motor 96—98 drives said rheostat 92 through a shaft 94 and has its field 96 connected directly across said constant potential source 89. The armature 98 of said motor 96—98 is connected on one side by the conductor 100 to an adjustable contactor 102 on a resistance 104 and on its other side through a conductor 106, brush 108, and said screw 78 and nut 80 to said moving contactor 82 on said rheostat 84, said resistance 104 having its ends connected directly across said bus lines 42 and 43, whereby it is directly in shunt with the armature of said generator 31. Now with the connections made as shown it is evident that the voltage across that section of resistance 104 lying between bus 42 and contact 102 will be kept the same as the voltage between point 90 and moving contact 82 for if the voltage across the section mentioned of resistor 104 were greater than the voltage across the resistance between 90 and 82 then the voltage at 102 would be higher than at contact 82 and current would flow from said resistor contact 102 through lead 110 resistor 84, through lead 106 to motor armature 98 and back through lead 100 to the resistor contact 102 and this would cause motor 96—98 to operate to cut resistance 92 into field 89 until the two voltages were the same. It will thus be seen that the voltages across busses 42, 43, at no load on the turbo generator, will bear substantially the same ratio to the voltage on said busses 42, 43 at 100 per cent load on said turbo generator, as the said resistance 87 bears to said resistance 87 plus resistance 84. Thus as the load on the turbo generator is increased, the voltage across busses 42, 43 is correspondingly increased, resulting in a similar increase in voltage across the auxiliary motor circuit 52, 53.

A lead 120 connects from an adjustable contactor 122 on said resistor 104, to a relay contact 123, and another lead 124 connects from another contactor 126 on said resistor 104 to a second relay contact 127, in operative relation with said contact 123, and a contactor 128 carried by a solenoid armature 130 is in operative relation to make and break current path between said relay contacts 123 and 127. In operative relation to said armature 130, to move and hold said contactor 128 in open circuit position when a predetermined voltage is impressed thereacross, is a solenoid 132 connected across the potential transformer secondary 134 which is in operative relation to the primary 136 connected across said alternating current bus lines 4, 5, and 6.

Now, should the voltage across said bus lines 4, 5, 6 fall below a predetermined value necessary to maintain, through transformer 134—136, the above mentioned predetermined potential value required on said solenoid 132 to hold said contactor 128 in the open circuit position, then said armature 130 and contactor 128 will fall and current path across contacts 123, 127 will be established whereby the portion of said resistor 104 between said contactors 122 and 126 will be short circuited and the direct current voltage impressed across bus line 42 and contactor 102 will be immediately and suddenly increased. This increase in direct current potential will, of course, be applied to said armature 98 and will cause it to rotate to cut in resistance on said rheostat 92 whereby the field current of direct current generator 31—89 is reduced and the voltage impressed on the bus lines 42, 43 is decreased. From this description of the above apparatus and its operation it will be seen that a reduction in voltage across the main bus lines 4, 5, 6 or said turbo generator 64, as by a short circuit or other cause, will cause a reduction in the voltage impressed on the bus lines 42, 43 of said direct current generator 31. Like apparatus, not indicated, is used for expediting the cutting down of the voltage impressed on the bus lines 44, 45 of said direct current generator 33 in response to a falling off in potential across said bus lines 1, 2, 3. In this manner when the power applied to synchronous motor 7 (or 12) is decreased through decrease of potential the load thereon as applied by said direct current generator 31 (or 33) is accordingly decreased and it can remain in synchronous operation and maintain the auxiliary apparatus 140 fed thereby through said generators 30 and 31 (or 32 and 33) in operation even though under only part load.

In Figure 3 of the drawing the generator 101 has main power circuit 102, 103, 104 feeding its energy through wattmeter 65. Said wattmeter 65 drives sprocket wheel 74, chain 77 and sprocket wheel 76 and threaded shaft 78 on which is threaded the nut 48 which is thereby moved back and forth to the right for heavy loads on said generator 101 and to the left for light loads on said generator 101.

Said nut 48 carries a pin 112 which turns cams 115, 116 and 117. These cams control air pressure in pipes 122, 123 and 124 by allowing air to rush in from pressure pipe 125 or exhaust to atmosphere depending on whether the cam opening is to the right or to the left. Said generator 101 also has auxiliary circuit lines 130, 131, 132 connected to the slip ring, of induction motor 133 by leads 135, 136, 137 and circuit make and break device 139. Motor 133 drives blower 140 furnishing cooling air to generator 101.

Motor 133 has leads 142, 143, 144 connecting its slip rings to resistances 146, 147, 148. Resistances 150, 151, 152 are short circuited by leads 154, 155, 156 and make and break device 158 which is closed by air pressure against piston 160 and opens under gravity.

Likewise resistances 162, 163, 164 are short circuited by the make and break device 165 through the operation of piston 166 and said resistances 146, 147, 148 are short circuited by the make and break device 168 through the operation of piston 170. The operation of this device is as follows:

At no load on the generator said nut 48 is to the left, said valves 115, 116, 117 have released pressure in pipes 122, 123, 124 and all resistance is cut in the motor of said induction motor 133, the latter running at low speed. As the load rises nut 48 moves to the right and turns valve 115 putting air pressure in pipe 122 and closing said make and break device 158. This switch short circuits resistance 150, 151, 152 and said motor 133 speeds up. As the load increases valve 126 is turned and said circuit make and break device 165 closes, short circuiting resistances 162, 163, 164 and said motor 133 speeds up further. At full load said valve 127 is turned and said circuit make and break device 168 cuts out all the resistance and said motor attains full speed. With a falling off of the load the steps of controlling the speed of the motor will be reversed as will readily be seen.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention and the operation thereof what I claim and desire to protect by Letters Patent is:

1. In combination an alternating current source of power; a synchronous motor connected thereto; a direct current generator having a shunt field and driven by said motor; means for maintaining said synchronous motor in operation at very low voltages on said source of power comprising a resistor in the circuit of said shunt field, and means in operative relation to said source of power and operative upon reduction in voltage impressed thereby to increase the resistance in said shunt field circuit.

2. In combination; a source of alternative current comprising a turbo generator; a synchronous motor connected to said source; auxiliary apparatus including direct current motors; a direct current generator in driven relation to said synchronous motor; and means for maintaining said synchronous motor in driving operation under very low power voltage conditions to keep said auxiliary apparatus in operation at such low voltage conditions comprising a resistor in shunt across said direct current generator, and means in operative relation to said source of power and, operative upon reduction in voltage impressed thereby, to reduce the resistance shunted across said direct current source.

3. In combination with a turbo generator for alternating current; auxiliary apparatus therefor including direct current driving motors; a motor generator set including an alternating current motor connected to said turbo generator and a direct current generator having a shunt field winding and driven from said alternating current motor and electrically connected to said direct current motors; and means in operative relation to said direct current generator and operative by increments and decrements of load on the turbo generator adapted to produce corresponding increments or decrements in voltage of said direct current generator.

4. In combination, an electric alternating current generator; feed lines therefor, a turbine in driving relation to said generator, auxiliary apparatus for said turbine, means comprising a direct current generator for driving said auxiliary apparatus, and means connected to the feed lines from said alternating current generator and in operative relation with said direct current generator and responsive to power output changes on said feed lines to produce corresponding changes in the voltage of said direct current generator.

5. In combination, an electric generator, feed lines therefor, a turbine in driving relation to said generator, auxiliary apparatus for said turbine, means comprising a direct current generator for driving said auxiliary apparatus, and means comprising a wattmeter connected to the feed lines from said generator and in operative relation with said direct current generator and responsive to power output changes on said feed lines to produce corresponding changes in the voltage of said direct current generator.

6. In combination, an electric generator, feed lines therefor, a turbine in driving relation to said generator, auxiliary apparatus for said turbine, means for driving said auxiliary apparatus comprising a motor adapted to receive power from said generator and a direct current generator in driven relation with said motor, and means connected to said feed lines and in operative relation with said direct current generator and responsive to variations in power thereon for producing corresponding changes in the voltage of said direct current generator.

7. In combination, an electric generator, feed lines therefor, a turbine in driving relation to said generator, auxiliary apparatus for said turbine, means for driving said auxiliary apparatus comprising a synchronous motor adapted to receive power from said generator and a direct current generator in driven relation with said motor, and means connected to said feed lines and in operative relation with said direct current generator and responsive to variations in power thereon for producing corresponding changes in the voltage of said direct current generator.

In testimony, that I claim the invention set forth above I have hereunto set my hand this 15th day of December, 1927.

FRAZER W. GAY.